Sept. 21, 1965 W. R. JOHNSON 3,208,004
CASCADED AMPLIFIER INCLUDING COUPLING NETWORKS
TO PRODUCE EQUALIZATION
Filed July 1, 1960 2 Sheets-Sheet 1

INVENTOR:
Wayne R. Johnson
By Smyth, Roston & Pavitt
Attorneys.

INVENTOR:
Wayne R. Johnson
By Smyth, Roston & Pavitt
Attorneys.

United States Patent Office 3,208,004

Patented Sept. 21, 1965

3,208,004

CASCADED AMPLIFIER INCLUDING COUPLING NETWORKS TO PRODUCE EQUALIZATION

Wayne R. Johnson, Los Angeles, Calif., assignor to Minnesota Mining and Manufacturing Company, St. Paul, Minn., a corporation of Delaware Filed July 1, 1960, Ser. No. 40,463
5 Claims. (Cl. 330—153)

This invention relates to amplifier circuits and, more particularly, to an amplifier circuit for recording on a magnetic medium. The amplifier includes equalization means to compensate for the magnetic limitations of the medium.

The magnetic limitations of magnetic recording mediums result in the higher frequency signals being recorded and retained at levels lower than the lower frequency signals. The limitations include the different hysteresis loops for the different frequency signals and the relative demagnetization effect of the higher frequency signals. The effect is somewhat similar to the aperture effect provided by television camera tubes.

Aperture compensation is utilized in television systems to boost the high frequency components of the video signal. Such compensation is desirable because the limited resolving power of lenses and the finite size of scanning spots cause the effective frequnecy-response characteristic of video signals from a television camera tube to have a low-pass characteristic. Efforts to compensate electrically for these effects first encountered the difficulty that the compensating circuits caused phase distortion, whereas the aperture distortion introduced by the camera tube is not accompanied by phase distortion. The distortion introduced by the limitations of the magnetic recording medium is similarly not accompanied by phase distortion. Various compensating circuits have been developed for correcting the aperture distortion without phase alteration. However, with aging of components and especially of the vacuum tubes utilized in such circuits, the compensating characteristic changes.

In color systems, good operative compensation is highly desirable because the higher gamma correction reduces the compensatory effect of the power-law action of the camera tube. The effects of changes in the compensation characteristic are, accordingly, more noticeable in color television systems. In magnetic recording systems, there is also no compensatory effect so the distortions due to the magnetic limitations are material distortion factors.

In a specific illustrative embodiment of this invention, a recording amplifier is provided which compensates for the magnetic limitations of the recording system without introducing any phase distortion and with the compensating characteristic being unaffected by the aging of the active elements of the amplifier. The embodiment includes a cathode follower which introduces the signals to be compensated to a delay line and to an attenuating arrangement. The output impedance of the cathode follower matches the characteristic impedance of the delay line. The delay line is not, however, terminated at a matched impedance so that reflections are returned to the cathode follower and then to the attenuating arrangement. The delay interval provided by the delay line is equal to only the period of the highest frequency to be amplified.

The signal introduced to the attenuating arrangement is the sum of the signal from the cathode follower and the reflected signal from the delay line. The attenuator is balanced so as not to introduce a phase shift, and it attenuates the higher frequencies more than the lower. The attenuator is adjustable to control the ratio of compensation between the high and low frequencies.

The attenuated signal is introduced to the cathode of an amplifier tube and the delayed signal from the delay line is introduced to its control grid. The output of the amplifier is the properly compensated signal. Any variation of transconductance of the amplifier tube or other active elements in the recording amplifier does not affect the compensation characteristic.

Further advantages and features of this invention will become apparent upon consideration of the following description when read in conjunction with the drawing wherein.

Figure 1:
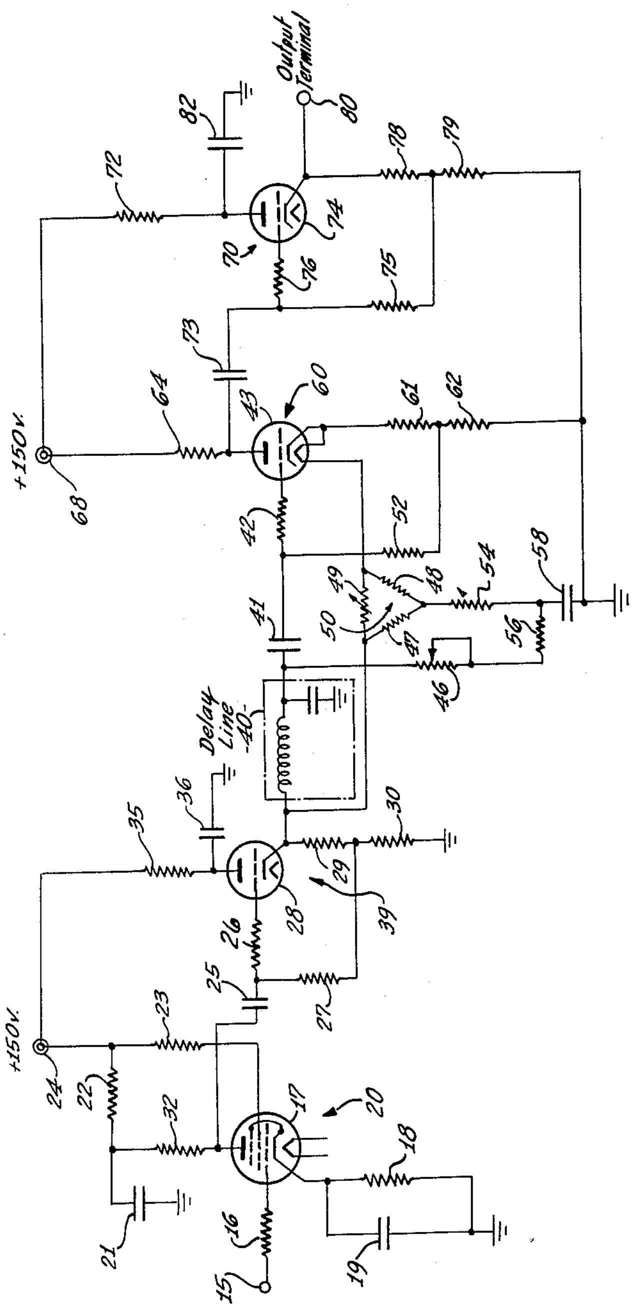
FIGURE 1 is a circuit representation of the recording amplifier circuit of this invention including equalizing means for compensating the magnetic limitation.
Figure 3:
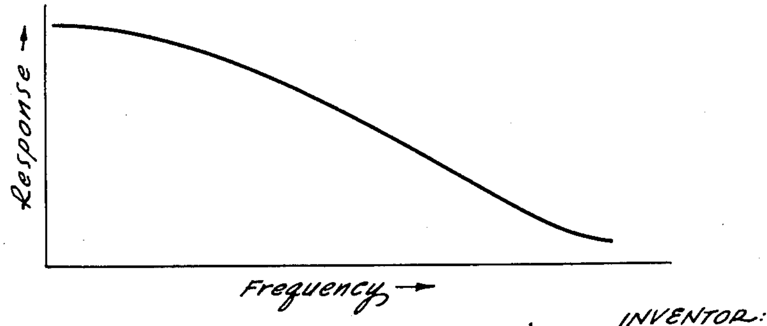
FIGURE 3 is a curve illustrating the effect of the magnetic limitations of the recording medium.

Referring to FIGURE 1, the signals to be recorded are introduced at an input terminal 15 to the recording amplifier circuit of this invention. The recording amplifier couples the signals to a recording arrangement, not shown, which has a recording and retentivity characteristic illustrated in FIGURE 3. The recorded signals at the higher frequencies are at lower levels than those at the lower frequencies because of the magnetic limitations of the recording arrangement. The recording amplifier shown in FIGURE 1 compensates for this distortion by the recording arrangement so that the signals on the recording medium, also not shown, are at the same level for all frequencies.

The input terminal 15 to the recording amplifier is coupled to a preamplifier 20 which is the first stage of the recording amplifier. The control grid of a pentode 17 in the preamplifier 20 is coupled by a resistor 16 to the input terminal 15. The pentode 17 may be one-half of a tube 6U8, and the resistor 16 may have a suitable value such as 100 ohms. The preamplifier 20 may be a conventional high-frequency amplifier having the cathode of the pentode 17 coupled by a resistor 18 and a capacitor 19 to ground. The resistor 18 may have a value of 180 ohms and the capacitor 19 may have a value of 0.002 microfarad. The cathode of the pentode 17 is also coupled to the suppressor grid of the tube 17. Anode potential for the pentode 17 is provided from a positive potential source 24 through two serially connected resistors 22 and 32. The source 24 may have a suitable value such as 150 volts and the resistors 22 and 32 may have values respectively of 1 kilohm and 2.2 kilohms. The junction between the resistors 22 and 32 is connected to ground by a shunting capacitor 21 which may have a value of 25 microfarads. The screen grid of the pentode 17 is biased by the source 24 through a resistor 23 which may have a value of 100 ohms.

The preamplifier 20 functions to amplify and phase invert the signals introduced at the input terminal 15. The amplified signals are coupled from the anode of the pentode 17 through a capacitor 25 to a cathode follower 39 which is the second stage of the recording amplifier. The capacitor 25 may have a value of 0.1 microfarad. The cathode follower 39 includes a triode 28 having its control grid coupled by a resistor 26 to the capacitor 25. The triode 28 may be one-half of a 6BK7 tube, and the resistor 26 may have a value of 100 ohms. Anode potential is provided from the source 24 through a resistor 35 and the cathode is coupled to ground through two serially connected resistors 29 and 30. The resistors 26, 29 and 30 may have suitable values such as 100 ohms, 56 ohms and 1 kilohm, respectively. The junction between the capacitor 25 and the resistor 26 is coupled by a grid leak resistor 27 to the junction between the resistors 29 and 30. The resistor 27 may have a value of 470 kilohms. The anode of the triode 28 is shunted to ground by a capacitor 36 which may have a value of 12 microfarads.

The cathode follower 39 functions to provide a high impedance input for the signals to a delay line 40. The delay line 40 may have a characteristic impedance of 100 ohms and provide for a delay, illustratively, of one-half of a microsecond for the signals from the cathode follower 39. The upper frequency of the signals may be 1 megacycle. The output of the delay line 40 is not matched so that a reflected component is returned through the delay line. The delay line 40 is terminated by a potentiometer 46 which is serially connected with a resistor 56 to a capacitor 58. The potentiometer 46 may have a resistance between end terminals of 1 kilohm and the resistor 56 may have a value of 100 ohms. The setting of the potentiometer determines the value of the terminating impedance and, accordingly, the magnitude of the reflected component.

Assuming a loss-less delay line, the signal at the input end of the delay line 40 is the vector sum of the signal from the cathode folower 39 plus a reflected signal delayed by the round trip through the delay line 40. Assuming no loss in the line and an input termination sufficiently perfect to absorb all reflections, the effective response curve at the output end of the delay line 40 is flat. That is, there is no variation in response with different frequencies due to the transmission through the delay line 40.

The signal at the output end of the delay line 40 is coupled through a capacitor 41 and a grid resistor 42 to the control grid of a current control member or an amplifying member such as triode 43 in an amplifier stage 60. The capacitor 41 may have a value of 0.1 microfarad, the resistor 42 may have a value of 100 ohms, and the triode may be one-half of a 6BK7 tube. The junction between these two components is connected by a resistor 52 to the junction between two serially connected cathode resistors 61 and 62 coupled between a current control element of the current control member such as the cathode of the triode 43 and ground. The resistors 52, 61 and 62 may have suitable values such as 470 kilohms, 56 ohms and 1 kilohm, respectively. The tube 43 forms part of a conventional type amplifier 60 which is biased at its anode from a positive potential source 68 through a resistor 64. The source 68 may have a value of +150 volts and the resistor 64 may have a value of 6.8 kilohms.

The signals from the cathode follower 39 are applied through the delay line 40 to a control element of the current control member such as the control grid of the triode 43 and through an attenuating arrangement 50, which is hereinafter described, to the cathode of the triode 43. The signals at the output element of the current control member such as the anode of the triode 43, which anode is effectively the output of the amplifier 60, depend in this manner upon the signals introduced both to the control grid and the cathode of the triode 43.

The attenuator arrangement 50 includes balanced circuitry consisting of three resistors 47 through 49 coupled in a delta arrangement, a resistor 54 and a capacitor 58. The resistor 54 and capacitor 58 are serially connecetd from the delta arrangement to ground. The resistors 47 through 49 may have suitable values such as 100, 100 and 70.7 ohms, respectively; the resistor 54 may have a suitable value such as 141 ohms; and the capacitor 58 may have a suitable value such as 200 microfarads. The resistors 49 and 54 may be adjustable, as shown in FIGURE 1. The capacitor 58 causes the attenuator arrangement 50 to follow the relatively slow or direct current potentials at the cathode of the triode 28, but shunt part of the relatively high frequency components to ground. The attenuator arrangement 50 is, accordingly, a low frequency attenuator and may be set to provide for an attenuation of approximately a factor of 4 to 1 between the highest frequency and the lowest frequency of the signal. The resistor 54 and the resistor 49 are adjustable to vary the attenuation to control the ratio of attenuation between the different signals. As indicated above, for the 4 to 1 attenuating ratio, the resistor 54 may be 141 ohms and the resistor 49 may be 70.7 ohms and the two resistors 47 and 48 may be 100 ohms each. The 100 ohms resistors 47 and 48 are utilized to provide for a matched impedance at the input of the delay line. The cumulative impedance presented by the cathode follower 39 and the attenuator 50 to the delay line 40 is equal to the characteristic impedance of the delay line 40. Reflections from the end of the delay line 40, accordingly, are not reflected back from the input of the delay line.

The output of the attenuator 50 is introduced to the cathode of the triode 43, and as described above, the output from the delay line 40 is introduced to the control grid of the triode 43. The conduction of the triode 43 is, therefore, controlled in accordance with the signals introduced through the delay line 40 and through the attenuator 40.

As described above, the effective response curve at the output of the delay line 40 is substantially flat. The signals at the input of the delay line 40, including the reflected component, vary with the frequency of the signals and give an effective cosine wave response characteristic being greater for higher frequencies. Frequency components having a period greater than twice the delay of the line are reversed in phase relative to the signals arriving from the cathode follower 39 so that the response falls off for frequencies having a period greater than twice the delay interval of the line 40. The signals from the two ends of the line are effectively subtracted in the amplifier 60 because one is applied to the control grid and the other is applied to the cathode of the triode 43. The input response characteristic to the attenuator arrangement 50 is, accordingly, a cosine shaped wave increasing from the lower frequencies to a maximum at 1 megacycle. The input to the arrangement is compensated somewhat for the magnetic limitations of the recording apparatus. The attenuator functions to modify the response characteristic to provide for a predetermined ratio of amplifications of the high to low frequencies.

Figure 2:
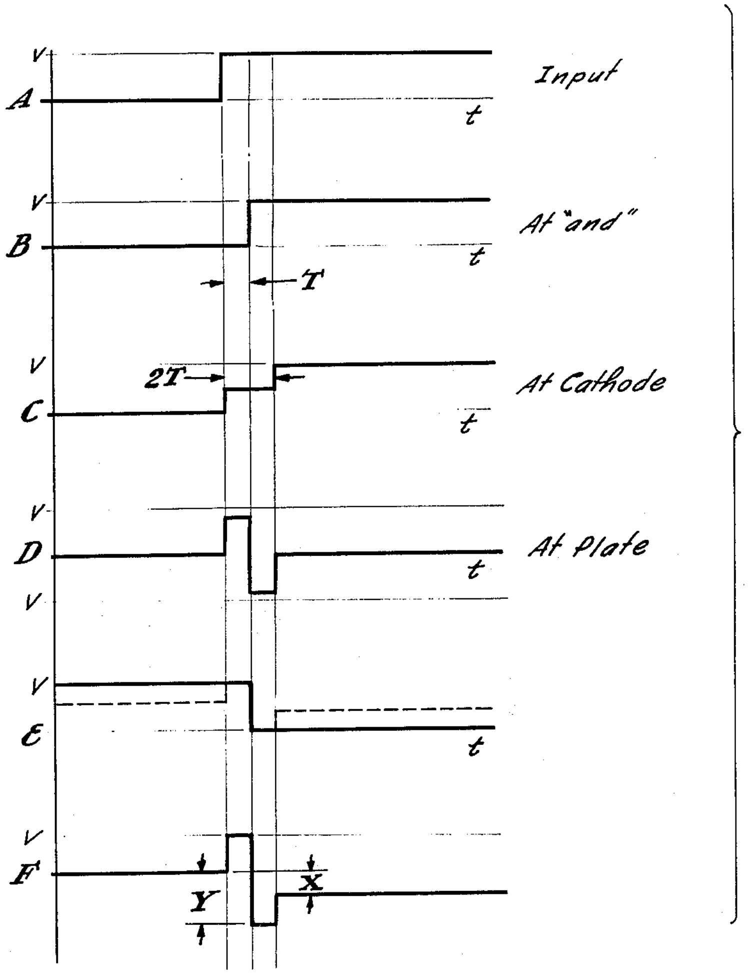
FIGURE 2 is a series of curves illustrating the operation of the recording amplifier circuit to this invention.

Referring to FIGURE 2, assume that curve A represents the signal from the cathode follower 28. Curve B represents the signal as introduced to the control grid of the triode 43. The increase in potential is delayed by the period T which is the delay interval of the line 40. The attenuator 50 does not provide for any delay so that that cathode potential increases at the same time that the potential is increased at the input of the delay line 40. The increase of the potential at the cathode of the triode 43 provides for a reduction of conduction through the triode 43 to in turn provide for an increase in potential at the anode of the triode 43. The cathode potential remains at the value determined by the initial increase of input potential until the reflected wave is returned through the delay line and the attenuator 50 to the cathode of the triode 43. This reflected wave is also positive to further increase the cathode potential. As shown in curve C of FIGURE 2, the cathode potential, accordingly, increases at two steps with the second step taking place at an interval equal to 2 T after the increase of input potential from the cathode follower 39.

Curve D in FIGURE 2 illustrates the changes of potential at the anode of the triode 43 due to the input signal of curve A in FIGURE 2. When the cathode potential of the triode 43 increases, it reduces the current through the triode 43 to increase the anode potential. Thereafter, when the input signal traverses the delay line 40 and arrives at the control grid of the triode 43, it increases the conduction through the triode 43 to reduce the anode potential. The anode potential remains at this reduced value until the second step of the cathode potential occurs. When the reflected wave arrives at the cathode of the triode 43, it reduces somewhat the current through the triode to increase the anode potential. Curve D illustrates this two-step potential change due to a change of potential of the input signal.

Curve E of FIGURE 2 illustrates by the solid curve the output potential from the amplifier 60 when the attenuator arrangement 50 presents an infinite impedance and by the dashed curve, the output potential from the amplifier 60 when the attenuator presents a reduced impedance. Due to the shunting effect of the capacitor 58, the higher frequency signals are shunted to ground so that the arrangement 50 presents an effective maximum impedance for these signals. For the lower frequencies, the arrangement 50 presents smaller effective impedances. The signal to the cathode of the triode 43 and the output at the anode of the triode 43, accordingly, depend upon the frequency of the signal from the cathode follower 39. The ratio of low frequency signal to high frequency signal at the cathode of the triode 43 is 4 to 1 (12 db) when the ratio Y to X in curve F of FIGURE 2 is 4 to 1 for the one megacycle component of the signals and when the attenuator has a reduced impedance as represented by the dashed lines in curve E.

The attenuator arrangement 50 is symmetrical so that no phase distortion is introduced to the signals. Since the lower frequency signals provide for larger signals at the cathode of the triode 43, the response of the higher frequency signals relative to the lower frequency signals is increased. If the characteristics of the triode 43 or any other components in the recording amplifier change, phase distortion is not introduced. If the triode 43 changes, it affects both signals equally as it is the difference between them which determines the compensation. The compensation characteristic, accordingly remains the same even with changes in the characteristic of the triode 43. Moreover, if the characteristics of some of the circuit components change or are adjusted to provide for an over-equalized condition, the phase still remains constant.

The output of the amplifier 60 is coupled through a capacitor 73 to a cathode follower 70. The capacitor 73, which may have a value of 0.1 microfarad, is coupled by a resistor 76 to the control grid of a triode 74 in the cathode follower 70. The triode 74 may be one-half of a 6U8 tube, and the resistor 76 may have a value of 100 ohms. The junction between the capacitor 73 and the resistor 76 is coupled by a resistor 74 to the junction of two serially connected resistors 78 and 79. The resistors 75, 78 and 79 may have respective values of 470 kilohms, 56 ohms and 1 kilohm. The anode of the triode 74 is connected by an anode resistor 72 having a value of 100 ohms. The anode of the triode 74 is also shunted to ground by a capacitor 82 having a value of 25 microfarads. The output from the cathode follower 70 is provided from the cathode of the triode 74 to the output terminal 80.

The amplifier shown in FIGURE 1 may be utilized as a recording amplifier as described above, or as a reproducing amplifier to compensate for the magnetic limitations of the recording medium. Further, the particular frequencies and magnitudes of component characteristics are merely illustrative.

Although this invention has been disclosed and illustrated with reference to particular applications, the principles involved are susceptible of numerous applications which will be apparent to persons skilled in the art. The invention is, therefore, to be limited only as indicated by the scope of the appended claims.

I claim:

1. An amplifier for wide-band signals, including, a first stage having input and output terminals and having the input terminal connected to receive the wide-band signals; a delay line coupled electrically to said first stage and providing for a delay equal to one-half the period of the highest frequency component of the wide-band signals; a terminating impedance for the delay line which does not match the characteristic impedance of the delay line whereby reflections of the signals are returned to the first stage through the delay line; an amplifier including a current control member having a first control element capacitively coupled to the termination of the delay line to receive the signals from the delay line, a second control element, and an output element; an attenuator arrangement connected between the output terminal of the first stage and the second element of the current control member for introducing the signals from the first stage to the second control element of the current control member with an attenuation dependent upon the frequency of the signals; and output means connected to the output element of said current control member for producing an output signal at each instant in accordance with the relative values of the signals introduced to the first and second control elements at that instant.

2. An equalizing amplifier for wide-band signals, including, a delay line having an output terminal and an input terminal and having a particular impedance; means connected to the output terminal of the delay line and having an impedance different from the particular impedance to provide a mismatch of impedances with the delay line for a reflection of signals from the output terminal of the delay line to the input terminal of the delay line; a current control member having a first control element coupled to the output terminal of the delay line to receive the output signals from the delay line, a second control element, and an output element; attenuator means coupled to the input terminal of the delay line to receive the signals passing to the delay line and to provide a change in the amplitude characteristics of the signals in accordance with the frequency characteristics of the signals; means connecting the attenuator means to the second control element of said control member to introduce the signals from the attenuator means to the second control element; output means connected to the output element of said current control member to produce output signals in accordance with the relative characteristics of the signals on the first and second control elements of the current control member; and means operatively coupled to the input terminal of the delay line and to the attenuator means for introducing the wide-band signals to the delay line and the attenuator means.

3. An amplifier for wide-band signals, including, a first stage having input and output terminals and having its input terminal connected to receive the wide-band signals; a delay line having input and output terminals and having its input terminal coupled to the output terminal of said first stage and providing for a delay equal to substantially one-half the period of the highest frequency component of the wide-band signals; a terminating impedance connected to the output terminal of the delay line and having an impedance value which does not match the characteristic impedance of the delay line whereby reflections of the signals are returned through the delay line to the input terminal of the delay line; a current control member having a first element capacitively coupled to the output terminal of the delay line to receive the signals from the delay line, a second control element, and an output element; an attenuator arrangement coupled to the first stage for receiving a composite signal including the signal from the first stage and the reflection from the delay line, said attenuator arrangement being a balanced arrangement and including means for attenuating the higher frequencies of the wide-band signals by a greater amount than the lower frequencies of the wide-band signals; means connecting the attenuator arrangement to the second control element of said current control member to introduce the signals from the attenuator arrangement to the second control element; and output means connected to the output element of said current control member to produce signals in accordance with the relative characteristics of the signals on the first and second control elements of the current control member.

4. An equalizing amplifier for wide-band signals, including, a delay line having input and output terminals; a current control member having a first control element coupled to the output terminal of the delay line to receive the signals from the delay line and having a second control element and an output element; said delay line having characteristics to provide for a delay equal to one-half the period of the highest frequency component of the wide-band signals; a frequency responsive attenuating circuit coupled to the input terminal of the delay line for modifying the amplitudes of signals introduced thereto in accordance with the frequency characteristics of the signals, said attenuating circuit being adjustable and including means for attenutaing the higher frequencies of the wide-band signals by a greater amount than the lower frequencies of the wide-band signals; means coupled to said attenuating circuit and to the second control element of the current control member for introducing the modified signals from the attenuating circuit to the second control element of the current control member; output means connected to the output element of said current control member to produce signals in accordance with the relative characteristics of the signals on the first and second control elements ofthe current control member; and means coupled to the delay line for providing a mismatch of impedances with the delay line to obtain a reflection of signals through the delay line from the output terminal of the delay line to the input terminal of the delay line.

5. An amplifier for wide-band signals, including, a first stage having input and output terminals and having its input terminal connected to receive the wide-band signals; a delay line coupled to the output terminal of the first stage and providing for a delay equal to substantially one-half the period of the highest frequency component of the wide-band signals; a terminating impedance connected to the output terminal of the delay line and having an impedance value which does not match the characteristic impedance of the delay line whereby reflections of the signals are returned through the delay line from the output terminal to the input terminal; a current control member having a first control element coupled to the output terminal of the delay line to receive the signals from the delay line and having a second control element and an output element; an attenuator arrangement connected to the output terminal of the first stage for receiving a composite signal including the signal from the first stage and the reflection from the delay line, said attenuator arrangement including a balanced circuit having first, second and third terminals and having the first terminal connected to the output terminal of the first stage, the balanced circuit being constructed to attenuate the composite signal without phase shift, the attenuator arrangement also including capacitive means coupled to the second terminal of said balanced circuit for attenuating the higher frequencies of the composite signal more than the lower frequencies of the composite signal; means connecting the third terminal of the balanced circuit of said attenuating arrangement to the second control element of the current control member to introduce the signals from the attenuator circuit to the second control element; and output means connected to the output terminal of the current control member to produce output signals in accordance with the relative characteristics of the signals on the first and second control elements of the current control member.

References Cited by the Examiner

UNITED STATES PATENTS

| | | | |
|---|---|---|---|
| 2,229,703 | 1/41 | Larsen | 330—151 |
| 2,874,279 | 2/59 | Miller | 333—29 X |
| 2,924,648 | 2/60 | Luther | 330—69 X |
| 2,950,440 | 8/60 | Cooper | 330—172 X |

ROY LAKE, *Primary Examiner.*

ELI J. SAX, NATHAN KAUFMAN, *Examiners.*